3,017,283
CORROSION INHIBITIVE PIGMENT

Leonard M. Bennetch, Bethlehem, Pa., and Charles P. West, Metuchen, and Howard H. Leiner, New Brunswick, N.J., assignors to Reichard-Coulston, Inc., New York, N.Y., a corporation of New York
No Drawing. Filed Apr. 30, 1959, Ser. No. 809,915
12 Claims. (Cl. 106—304)

This invention relates to pigment particles each coated with a soybean phosphatide composition comprising a major amount of inositol phosphatides and, more particularly, to red iron oxide pigment particles each coated with a soybean phosphatide composition comprising a major amount of inositol phosphatides for the purpose of obtaining coated pigment particles which, when added to paint or coating compositions, such as primer paints of the type as are red lead paints, function as corrosion inhibitive pigment particles in said compositions and result, after applied to metal surface to be protected by said paint composition, in a corrosion resistant protective coating.

Pigment particles generally are finely divided insoluble solids widely used in many various coating or paint compositions for providing durable colors and hues thereto and also act as opacifiers.

We have discovered that pigment particles each coated with a soybean phosphatide composition comprising a major amount of inositol phosphatides impart corrosion resistant properties to the pigment particles, thereby forming corrosion inhibitive pigment particles, which, when added to a paint composition, result in coatings having corrosion resistance properties not obtained by a like composition to which such uncoated pigment particles have been added.

More particularly, we have discovered that red iron oxide pigment particles each coated with a soybean composition comprising a major amount of inositol phosphatides can be used in place of, and in smaller amounts than, red lead ($Pb_3O_4$) pigment particles in red lead pigmented paint compositions to obtain more economical and more corrosion resistant protective coating. Heretofore, red lead pigmented primer paint compositions have found wide use in the protection of steel surfaces constantly exposed to the atmospheric elements. However, as is well known, red lead pigment particles are extremely heavy, having a specific gravity of approximately 9.1, and are extremely poisonous. To obtain a primer paint composition having the required covering properties and required durability, it has been found necessary to incorporate the red lead pigment particles in and make them part of said red lead primer paint composition in an amount of more than 50% by weight, and preferably in an amount of approximately 58% by weight, of the said primer composition, thereby making such a composition relatively expensive to formulate, particularly with respect to the cost of the red lead pigment therein.

Of particular importance is the requirement for the so-coated pigment particles to be easily handled and to be easily incorporated in and made part of the paint composition. Also, if the so-coated pigment particles are to be economically utilized, they must be capable of easy and economical manufacture. We have found that our so-coated pigment particles are easily handled and are easily incorporated in and made part of the paint compositions and are easily and economically manufactured. Also, we have found that a true uniformly and completely coated particle is formed by so coating the particle with the coating composition only.

The pigment particle coating compositions with which the pigment particles are coated each comprise a major amount of inositol phosphatides, a minor amount of chemical lecithin, a minor amount of soybean oil, and an intermediate amount of chemical cephalin. By the expression "major amount" is meant at least 50 parts by weight per 100 parts by weight of the coating composition; by the expression "minor amount" is meant an amount between 0 and approximately 5 parts by weight per 100 parts by weight of the coating composition; and by the expression "intermediate amount" is meant an amount between approximately 20 and 35 parts by weight per 100 parts by weight of the coating composition.

The pigment particle coating compositions here utilized by us are obtained from a crude soybean phosphatide mixture by the well known solvent extraction methods and contain a major amount of inositol phosphatides, a minor amount of chemical lecithin, a minor amount of soybean oil, an intermediate amount of chemical, and small amounts of carbohydrates and other miscellaneous constituents originally present in the crude soybean phosphatide mixture carried over during the extraction process. The major ingredient of our coating composition is the inositol phosphatides present in an amount of more than 50% by weight of said coating composition. The pigment particles are coated with such an amount of said soybean phosphatide composition that each of said particles is uniformly and completely coated and preferably in such an amount that the ratio of the weight of said composition to the weight of the uncoated pigment particle is from about 0.026:1 to about 0.040:1.

An object of our invention is to provide a pigment particle substantially uniformly and substantially completely coated with a soybean phosphatide composition comprising a major amount of inositol phosphatides thereby imparting corrosion resistant properties to said particle and thereby forming a corrosion inhibitive pigment particle.

Another object of our invention is to provide an iron oxide pigment particle substantially uniformly and substantially completely coated with a soybean phosphatide composition comprising a major amount of inositol phosphatides thereby imparting corrosion resistant properties to said particle and thereby forming a corrosion inhibitive pigment particle.

Other objects of our invention will become readily apparent from the following detailed description which merely illustrates our invention and does not limit our invention.

The soybean phosphatide pigment particle coating composition has been previously sold as Gliddophil I and was used by us in a toluene solution, said solution with said composition dissolved therein having a specific gravity of 0.968 at 25.5° C., there being 4.2 pounds of solids per gallon of solution, said solution weighing 8.1 pounds per gallon, the solids content being 52% by weight of the solution. Said soybean phosphatide particle coating composition is also available as Centralex I and is used in a carbon tetrachloride solution, said solution with said composition dissolved therein having a specific gravity of 1.38 at 25.8° C., there being 3.8 pounds of solids per gallon of solution, said solution weighing 11.5 pounds per gallon, the solids content being 33.5% by weight of the solution.

This invention relates primarily to coated red iron oxide pigment particles, but also within the scope of our invention is included coated pigment particles such as zinc chromate, titanium oxide, yellow iron oxides, and extenders such as talc, among other coated pigment particles.

The soybean phosphatide composition known as either Gliddophil I or Centralex I is a solid granular product having a yellow color and has an approximate analysis as follows:

Chemical lecithin—4.0%; chemical cephalin—28.5%;

Inositol phosphatides—55%; soybean oil—4%; miscellaneous, including carbohydrates—8.5%.

This composition is a very strong water-in-oil emulsifier and, because of its bland taste and odor, has found use in the food fields. Lecithin is a phosphatide and is a quaternary ammonium compound having the formula

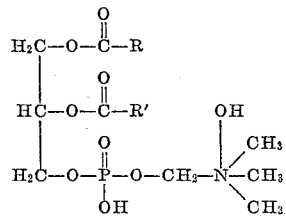

and cephalin also is a phosphatide and is a primary amine having the formula

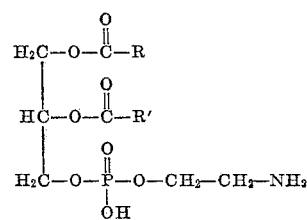

R and R' being the hydrocarbon radicals of the higher fatty acids, some of which are unsaturated and derived from such fatty acids as stearic, palmitic, oleic acids, etc. With respect to the inositol phosphatides, little is known as to the exact chemical structure of each of said phosphatides as present in the crude soybean phosphatides from which our coating composition is obtained. However, it is known that each of said phosphatides is apparently an organo-phosphoric acid-inositol-carbohydrate-nitrogen complex and is an ester of a fatty acid or acids with inositol phosphoric acid and choline, cholamine, or serine. Inositol is also known as cyclohexanhexanol and has the formula

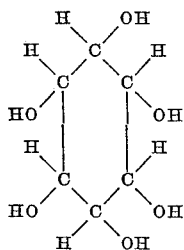

and the inositol phosphatides of our coating compositions are believed to include phosphatides having the formulae (1)

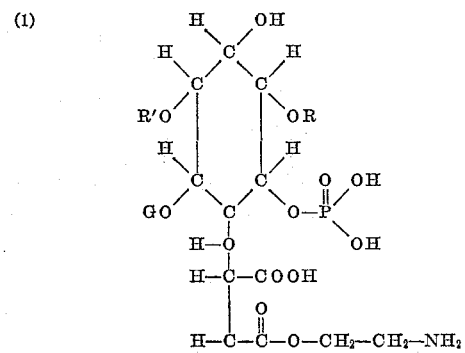

(2)

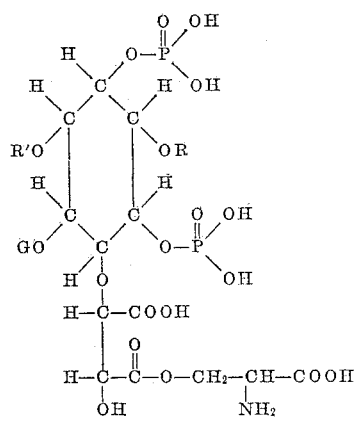

(3)

R and R' in (1) and (2), supra, representing higher fatty acid acyl radicals and G in (1) and (2) representing glycosidically linked D-galactose, and $R_1$ and $R_2$ in (3), supra, representing the hydrocarbon radicals of the higher fatty acids. As to the inositol phosphatides of our coating composition, Wittcoff in the book "The Phosphatides," published by Reinhold Publishing Company of New York City, N.Y., in 1951, set forth, on page 36 thereof, that Folch, in 1947, isolated the inositol-containing fraction from crude soybean phosphatides and found that said fraction contained mixed calcium, magnesium and potassium salts, glycerol, inositol, and galactose, and upon hydrolysis of this fraction, the following proportions of the hydrolysis product were found:

1 part amine; 2 parts inositol; 2 parts galactose; 2 parts phosphoric acid; and 3 parts fatty acids.

The coated pigment particles of our invention are formed by "dry blending" the pigment particles with the pigment coating composition. The pigment particles are placed into an externally heated planetary mixer, and the mixer may be a ribbon mixer or a sigma blade mixer, which is at a temperature of approximately 170° F. A solution of the coating composition in a solvent such as toluene or carbon tetrachloride is then added to the warm pigment particles, while being stirred or agitated, in successive small portions. The mixture is kept under agitation, and the heating of the mixture is continued until the solvent is evaporated, thereby leaving a mass of uniformly and completely coated and unagglomerated pigment particles.

The following examples of forming the coated pigment particles of our invention are given for the purpose of illustration only and are not considered to be limiting:

*Example 1a*

There are added to an externally heated planetary mixer 100 grams of red iron oxide pigment particles known as "750 Red Oxide," hereinafter more fully described and disclosed. A solution of Gliddophil I, hereinabove described and disclosed, in toluene, said solution having a specific gravity of 0.968 at 25.5° C., having 4.2 pounds of solid Gliddophil I per gallon of solution, said solution weighing 8.1 pounds per gallon, the solids content being 52% by weight of the solution, in the amount of approximately 5.2 cc. is diluted to approximately 10.4 cc. with toluene, and said 10.4 cc. of solution is slowly added to the mass of warm pigment particles under agitation. Care is taken that the temperature of the mass mixture does not rise above 40–50° C. Agitation of the mixture is continued for about 20 minutes after the solution has been completely added, and the toluene is evaporated, leaving a dry, completely and uniformly coated and unagglomerated mass of coated red iron oxide pigment particles, the ratio of the weight of the coating composition to the weight of the red iron oxide pigment particle being 0.026:1, that is, for every 100 grams of pigment 2.6 grams of coating material is utilized. The "750 Red Oxide" is a red iron oxide pigment formed by purifying iron oxide ore by calcination and drying and an average analysis of said "750 Red Oxide" is as follows:

Ferric oxide _____ 77%.
Particle size _____ 325 mesh (43 microns).
Oil absorption No. (ASTM) ___ 18.3.
Density (loose) #/ft.³ _____ 48.
Density (packed) #/ft.³ _____ 89.

The toluene solution of the soybean phosphatide coating composition is, as above disclosed, prior to dilution, utilized in an amount which is in the weight ratio of 5 parts of solution to 100 parts of the pigment particles.

*Example 2a*

To an externally heated planetary mixer are added 100 grams of the red iron oxide pigment particles known as "750 Red Oxide," hereinbefore fully disclosed and described. A solution of Gliddophil I, hereinbefore fully described and disclosed in Example 1a, in toluene in the amount of approximately 7.23 cc. is diluted to approximately 14.5 cc., and said so-diluted solution is slowly added to the mass of warm pigment particles under agitation. Care is taken that the temperature of the mass mixture does not rise above 40–50° C., and agitation is continued for about 20 minutes after the solution has been completely added, and the toluene is evaporated, leaving a dry, completely and uniformly coated and unagglomerated mass of coated red iron oxide pigment particles, the ratio of the weight of the coating composition to the weight of the red iron oxide pigment particle being 0.036:1. The toluene solution of the soybean phosphatide coating composition is, as hereinabove disclosed, prior to dilution, utilized in an amount which is in the weight ratio of 7 parts of solution to 100 parts of the pigment particles.

*Example 3a*

To an externally heated mixer are added 100 grams of the red iron oxide pigment particles known as "750 Red Oxide," hereinabove fully disclosed and described. A solution of Centralex I, hereinabove disclosed and described, in carbon tetrachloride, said solution having a specific gravity of 1.38 at 25.8° C., having 3.8 pounds of solid Centralex I per gallon of solution, said solution weighing 11.5 pounds per gallon, the solids content being 33.5% by weight of the solution, in the amount of approximately 8.5 cc. is slowly added to the mass of warm pigment particles under agitation. Care is taken that the temperature of the mass mixture does not rise above 200° F., and the heating is continued until the carbon tetrachloride is evaporated, leaving a dry, completely and uniformly coated and unagglomerated mass of coated red iron oxide pigment particles, the ratio of the weight of the coating composition to the weight of the red iron oxide pigment particle being approximately 0.039:1, that is for every 100 grams of pigment approximately 3.9 grams of coating composition is utilized.

*Example 4a*

To form Asbestine 3X pigment particles coated with our soybean phosphatide coating composition, the procedure set forth in Example 2a, supra, was followed, and there were obtained dry, uniformly and completely coated pigment particles, the ratio of the weight of coating composition to the weight of the pigment particle being approximately 0.036:1, that is for every 100 grams of pigment approximately 3.6 grams of coating composition is utilized. Asbestine 3X is a magnesium silicate inert pigment which is a talc.

Further, to illustrate the corrosion resistant properties of the coated pigments of our invention, the so-coated pigments are utilized into a paint primer coating composition embodying the same ingredients as those present in a commonly used red lead paint primer.

The following examples are further given to illustrate the corrosion resistant properties of the coated pigments of our invention and do not limit our invention:

*Example I*

A typical red lead paint primer composition commonly used for coating steel surfaces exposed to the atmospheric elements comprises the following ingredients:

| | Parts by weight |
|---|---|
| Red lead pigment ($Pb_3O_4$) | 950 |
| Celite 289 (diatomaceous earth) | 90 |
| Asbestine | 3 |
| Phenolic varnish [1] (50% solution) | 516 |
| Hi-Flash | 62 |
| Antiskinning agent | 1.5 |
| Lead naphthenate (24% solution) | 1.4 |
| Cobalt naphthenate (6% solution) | .3 |
| Manganese naphthenate (6% solution) | .3 |

[1] The phenolic varnish comprises (1) a resin formed by reacting paraphenyl phenol and formaldehyde, (2) linseed oil, and (3) chinawood oil.

To determine the corrosion resistant properties of said paint composition the following method is used:

Cold rolled steel panel is solvent cleaned, dipped in a 15% hydrochloric acid bath, rinsed with water, and immediately dried at 180–220° F. in an oven. The panel is then removed from said oven and allowed to cool to room temperature. The paint composition is thinned for spraying with Hi-Flash Naphtha and sprayed onto the panel in two coats, allowing 24 hours for drying between coats and a final 24 hour period for drying after the last coat is applied. The panel is thereby completely coated on its surface. The so-prepared coated panel is then scored or scratches to the metal substrate in the form of an X on the lower half portion, approximately ½″ from each side and bottom edge. A dry film thickness of approximately 2 to 2½ mils is obtained. Accelerated corrosion testing is carried out in a 5% salt fog box, at a 15° angle repose, in accordance with the ASTM procedure at an elevated temperature. Visual observations or readings of the so-exposed panels are periodically taken to determine the extent of blistering and rusting particularly at the scratch lines of the X.

*Example 1b*

The coated red iron oxide pigments formed in Example 1a supra, are substituted for the red lead of the composition of Example I, supra. For the 950 grams of red lead are substituted 534 grams of the coated red iron oxide pigments of Example 1a, supra, and the coating composition is formulated in exactly the same way as the coating composition of Example I, supra. The coated pigment, the Asbestine, the Celite 289, 350 parts of the phenolic varnish, and 32 parts of the Hi-Flash are mixed and ground over a three-roll mill to make a paste, and the remaining ingredients are then added thereto. The so-formulated paint composition is applied to cold rolled steel panels and exposed in the same manner as are the panels of Example I, supra.

Example 2b

The coated red iron oxide pigments formed in Example 2a, supra, are substituted for the red lead of the composition of Example I, supra. For the 950 grams of red lead are substituted 539 grams of the coated red iron oxide pigments of Example 2a, supra, and the coating composition is formulated in the same way as the coating compositions of Examples I and 1b, supra. Also, the so-formulated paint composition is applied to the cold rolled steel panels and exposed in the same manner as are the panels of Examples I and 1b, supra.

Example 3b

The coated red iron oxide pigments formed in Example 3a, supra, are substituted for the red lead of the composition of Example I, supra. For the 950 grams of red lead are substituted 541 grams of the coated red iron oxide pigments of Example 3a, supra, and the coating composition is formulated in the same way as the coating compositions of Examples I, 1b and 2b, supra. Also, the so-formulated paint composition is applied to the cold rolled steel panels and exposed in the same manner as are the panels of Examples I, 1b, and 2b, supra.

Example II

For the 950 grams of red lead of Example I are substituted 520 grams of uncoated red iron oxide ("750 Red Oxide," supra), and the coating composition is formulated in the same way as the coating compositions of Examples I, 1b, 2b, and 3b, supra. This so-formulated paint composition is applied to cold rolled steel panels and exposed in the same manner as are the panels of Examples I, 1b, 2b, and 3b, supra. These panels together with the panels of Example I having the red lead pigmented coating composition are utilized as control panels for purposes of comparison.

Example III

For the 950 grams of red lead are substituted 520 grams of uncoated Asbestine 3X, and the coating composition is formulated in the same way as the coating composition of Example I, supra. This so-formulated paint composition is applied to the cold rolled steel panels and exposed in the same manner as are the panels of Example I, supra.

Example 4b

For the 950 grams of red lead of Example I are substituted 539 grams of the coated Asbestine 3X pigment prepared in Example 4a, supra, and the coating composition is applied to cold rolled steel panels and exposed in the same manner as are the panels of Examples I, 1b, 2b, 3b, II, and III, supra. These panels are compared particularly with the panels of Example III, supra.

Each of the so-prepared panels is visually examined periodically during their exposure for from approximately 96 hours to approximately 350 hours. The panels prepared in accordance with Examples 1b, 2b, and 3c, supra, each having in the respective paint compositions our soybean phosphatide coated red iron oxide particles, withstand the salt spray exposure without any excessive blistering and without any appreciable rust appearance thereon extremely better than the red lead composition of Example I, supra, and definitely exceed the salt spray resistance of the red lead paint composition coated panels, which in turn, exceed the salt spray resistance of the uncoated iron oxide paint composition coated panels, and these results are so for periods up to approximately 350 hours. Likewise, with respect to the composition of Example II, supra, which comprises the uncoated red iron oxide, the panels so prepared do not withstand exposure as well as those of Example I, supra. With respect to the compositions of Example III, supra, the panels so prepared do not withstand exposure as well as those of Example II, supra. With respect to the compositions of Example 4b, supra (coated Asbestine 3X), the panels so prepared withstand exposure exceedingly better with respect to blistering and rust appearance than those of Example III, supra (uncoated Asbestine 3X), but not as well as those of Examples I and II, supra.

Also within the scope of this invention are coated pigment particles of the following iron oxide pigments, each having the following average analysis:

| | Size (mesh) | Oil Absorption No. (ASTM) | Sp. g. |
|---|---|---|---|
| "1183" Venetian Red: Ferric oxide, 40%, Calcium sulfate, 60% | 325 (99.5%) | 20.7 | 3.65 |
| "11788" Venetian Red: Ferric Oxide, 40%, Calcium sulfate, 60% | 325 (99.5%) | 17.1 | 3.36 |
| "11162" Venetian Red: Ferric oxide, 40%, Calcium sulfate, 60% | 325 (99.5%) | 15.0 | 3.45 |
| Irox Red "1350": Ferric Oxide, 97-98% | 325 (99.9%) | 31.9 | 4.6 |
| Irox Red "1360": Ferric Oxide, 97-98% | 325 (99.9%) | 30.3 | 4.6 |
| Irox Red "1370": Ferric Oxide, 97-98% | 325 (99.9%) | 32.3 | 4.6 |
| Irox Red "1380": Ferric Oxide, 97-98% | 325 (99.9%) | 36.1 | 4.6 |
| Irox Red "1390": Ferric Oxide, 97-98% | 325 (99.9%) | 36.7 | 4.6 |
| "1503" Red Oxide: Ferric oxide, 81-82%, Silica and silicates, Balance | 325 (99.9%) | 16.1 | 4.45 |
| "1640" Red Oxide: Ferric Oxide, 93-95%, Silica and silicates, 4-5% | 325 (99.9%) | 22.0 | 5.00 |
| "1675" Red Oxide: Ferric oxide, 70-75%, Silica and silicates, Balance | 325 (99.5%) | 21.8 | 4.05 |
| Super-Aetna Crimson Red Oxide: Ferric Oxide, 73-76%, Silica and Silicates, Balance | 325 (99.5%) | 12.3 | 4.29 |

Many changes and alterations may be made without departing from the spirit and scope of this invention which is set forth in the appended claims which are to be construed as broadly as possible in view of the prior art.

We claim:

1. A pigment particle uniformly and completely coated with a soybean phosphatide composition consisting essentially of, per 100 parts by weight, at least 50 parts of inositol phosphatides.

2. A pigment particle uniformly and completely coated with a soybean phosphatide composition consisting essentially of, per 100 parts by weight, at least 50 parts of inositol phosphatides, between 0 and approximately 5 parts of soybean oil, between 0 and approximately 5 parts of chemical lecithin, and between approximately 20 and 35 parts of chemical cephalin.

3. A pigment particle uniformly and completely coated with a soybean phosphatide composition consisting essentially of, per 100 parts by weight, 55 parts of inositol phosphatides, 28.5 parts of chemical cephalin, 4 parts of chemical lecithin and 4 parts of soybean oil.

4. A pigment particle coated with a soybean phosphatide composition consisting essentially of, per 100 parts by weight, at least 50 parts of inositol phosphatides, the ratio of the weight of said composition to the weight of the uncoated pigment particle being from about 0.026:1 to about 0.040:1.

5. A pigment particle coated with a soybean phosphatide composition consisting essentially of, per 100 parts by weight, at least 50 parts of inositol phosphatides, between 0 and approximately 5 parts of soybean oil, between 0 and approximately 5 parts of chemical lecithin, and between approximately 20 and 35 parts of chemical cephalin, the ratio of the weight of said composition to the weight of the uncoated pigment particle being from about 0.026:1 to about 0.040:1.

6. A pigment particle coated with a soybean phosphatide composition consisting essentially of, per 100 parts by weight, 55 parts of inositol phosphatides, 28.5 parts of chemical cephalin, 4 parts of chemical lecithin, and 4 parts of soybean oil, the ratio of the weight of said composition to the weight of the uncoated pigment particle being from about 0.026:1 to about 0.040:1.

7. An iron oxide pigment particle uniformly and completely coated with a soybean phosphatide composition consisting essentially of, per 100 parts by weight, at least 50 parts of inositol phosphatides.

8. An iron oxide pigment particle uniformly and completely coated with a soybean phosphatide composition consisting essentially of, per 100 parts by weight, at least 50 parts of inositol phosphatides, between 0 and approximately 5 parts of soybean oil, between 0 and approximately 5 parts of chemical lecithin, and between approximately 20 and 35 parts of chemical cephalin.

9. An iron oxide pigment particle uniformly and completely coated with a soybean phosphatide composition consisting essentially of, per 100 parts by weight, 55 parts of inositol phosphatides, 28.5 parts of chemical cephalin, 4 parts of chemical lecithin, and 4 parts of soybean oil.

10. An iron oxide pigment particle coated with a soybean phosphatide composition consisting essentially of, per 100 parts by weight, at least 50 parts of inositol phosphatides, the ratio of the weight of said composition to the weight of the uncoated iron oxide pigment particle being from about 0.026:1 to about 0.040:1.

11. An iron oxide pigment particle coated with a soybean phosphatide composition consisting essentially of, per 100 parts by weight, at least 50 parts of inositol phosphatides, between 0 and approximately 5 parts of soybean oil, between 0 and approximately 5 parts of chemical lecithin, and between approximately 20 and 35 parts of chemical cephalin, the ratio of the weight of said composition to the weight of the uncoated iron oxide pigment particle being from about 0.026:1 to about 0.040:1.

12. An iron oxide pigment particle coated with a soybean phosphatide composition consisting essentially of, per 100 parts by weight, 55 parts of inositol phosphatides, 28.5 parts of chemical cephalin, 4 parts of chemical lecithin, and 4 parts of soybean oil, the ratio of the weight of said composition to the weight of the uncoated iron oxide pigment particle being from about 0.026:1 to about 0.040:1.

References Cited in the file of this patent

UNITED STATES PATENTS 2,221,162     Ashburn et al. _____ Nov. 12, 1940